United States Patent [19]

Koyama

[11] Patent Number: 5,582,756

[45] Date of Patent: Dec. 10, 1996

[54] HEATER CONTROL DEVICE IN INJECTION MOLDING MACHINE

[75] Inventor: Hideki Koyama, Fujiyoshida, Japan

[73] Assignee: Fanuc Ltd., Yamanashi, Japan

[21] Appl. No.: 469,822

[22] Filed: Jun. 6, 1995

[30]   Foreign Application Priority Data

Jun. 8, 1994 [JP] Japan .................................. 6-148762

[51] Int. Cl.$^6$ .................................................. H05B 1/02
[52] U.S. Cl. .......................... 219/497; 219/491; 219/501; 363/36
[58] Field of Search ..................... 219/497, 499, 219/501, 505, 492, 491, 660; 363/34, 36

[56]   References Cited

U.S. PATENT DOCUMENTS 4,638,135   1/1987   Aoki ................................ 219/10.49 R
4,745,263   5/1988   Brooks ................................... 219/497
4,931,609   6/1990   Aoki .................................. 219/10.55 B
5,004,881   4/1991   Lee ...................................... 219/10.77

Primary Examiner—Mark H. Paschall
Attorney, Agent, or Firm—Staas & Halsey

[57]   ABSTRACT

A semiconductor switching circuit is connected to a DC power source for an inverter to control a servomotor in an injection molding machine, and a PWM signal controls an ON/OFF operation of a switching device in the semiconductor switching circuit so as to feed power to a heater of the injection molding machine. Since the DC power source feeds the heater with power, it is possible to overcome irregularity in power supply, and linearly vary a conducting time, thereby finely and accurately controlling a temperature. The DC power source for the inverter to control the servomotor also serves as a DC power source for the heater, resulting in no need for a special power source circuit.

16 Claims, 2 Drawing Sheets

HEATER CONTROL DEVICE IN INJECTION MOLDING MACHINE

BACKGROUND OF THE INVENTION

1. Field of the Invention

This invention relates to a heater control device to control temperatures of an injection cylinder, an injection nozzle, and so forth in an electrically-operated injection molding machine.

2. Description of the Related Art

AC current is supplied from an AC power source to a heater in an injection molding machine. Hence, temperature of the heater is controlled by a contactor or by a solid-state relay.

In a case of control by the contactor, an ON-OFF switching cycle is mechanically limited by a time required for a switching operation. It is thereby impossible to reduce an ON time interval and an OFF time interval. An increase in the ON time interval or the OFF time interval causes a problem in that a heater temperature to be controlled overshoots or undershoots a target value to a considerable extent. As a result, accurate control of the temperature becomes more difficult.

On the other hand, in case of control by the solid-state relay, the heater is turned ON or OFF according to voltage so that current and power can not easily be controlled. As a result, there is caused a problem in that a heat value of the heater can not accurately be controlled.

Further, when the AC power source is employed, supply current is varied to describe a sine curve in process of time. Therefore, constant current can not be supplied by making or breaking contact, or turning ON or OFF the solid-state relay, resulting in an irregular heat value.

As seen from the above facts, if the temperature of the heater is controlled by using the AC power source, irregularity in power supply extends a time required to increase the temperature. Further, fine control of current, voltage, or power becomes more difficult.

OBJECTS AND SUMMARY OF THE INVENTION

In view of the foregoing, it is an object of the present invention to provide a heater control circuit in an injection molding machine, which can eliminate irregularity in power supply to a heater in the injection molding machine, and can accurately control heater temperature.

The heater control circuit of the present invention employs, as a heating power source of a heater circuit, an inverter power source which is typically mounted on an electrically-operated injection molding machine so as to control a servomotor. The DC power source of the inverter is connected through a power adjusting circuit to the heater, thereby controlling the power adjusting circuit, resulting in adjustment of a value of power to be supplied to the heater.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
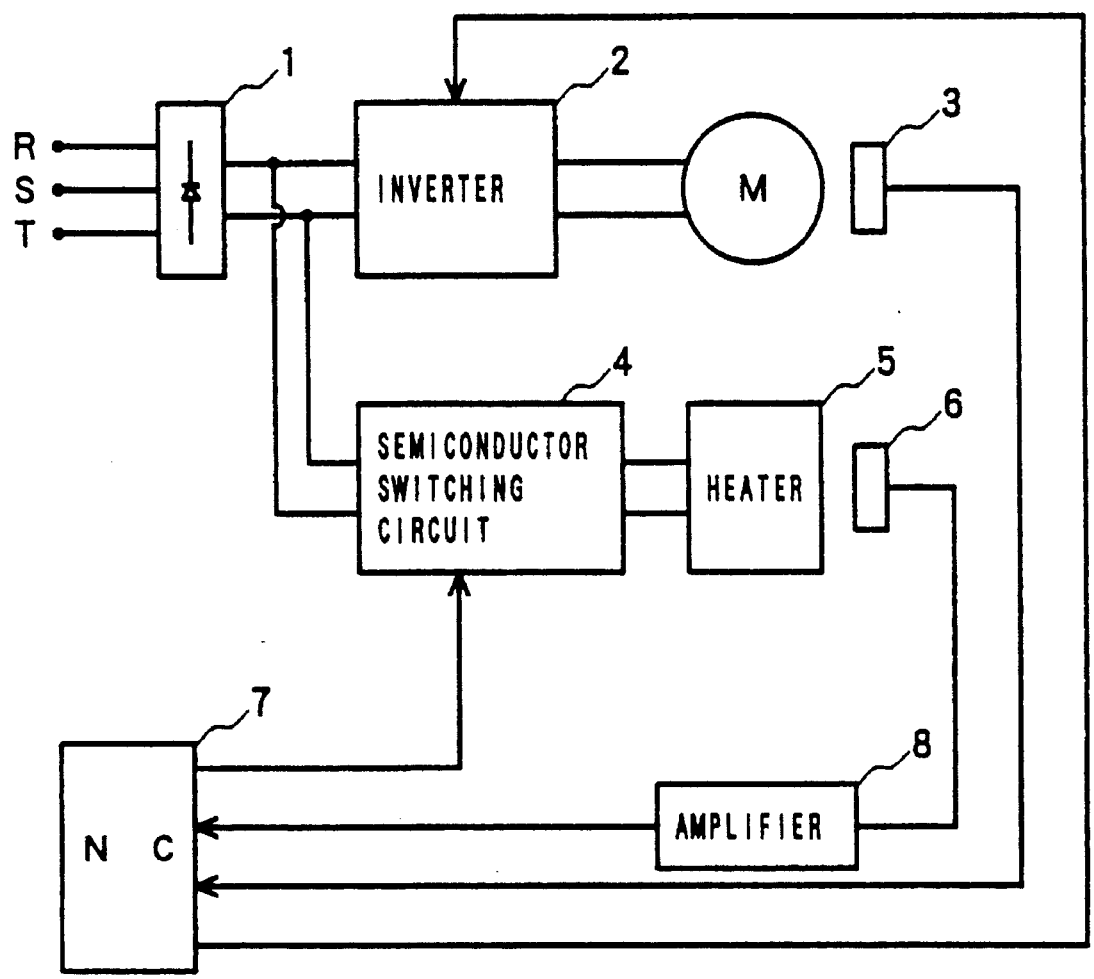
FIG. 1 is a function block diagram schematically showing an embodiment of a heater control circuit in an injection molding machine of the present invention.

FIG. 1 is a function block diagram showing an embodiment of a heater control circuit in an injection molding machine of the present invention. In FIG. 1, three-phase AC (having phases R, S, and T) is converted into DC through full-wave rectification in a DC power source 1, and the DC power source 1 supplies power to an inverter 2. An output terminal of the inverter 2 is connected to a servomotor M to drive, for example, an injection shaft in the injection molding machine. In the injection molding machine, a controller 7 such as a CNC unit outputs a PWM signal to the inverter 2 so as to control a switching operation of a switching device in the inverter 2 depending upon the PWM signal, thereby controlling current to be fed to each phase of the servomotor M. A detector 3 detects actual values of position, velocity, and each phase current of the servomotor M, and sends the values to the controller.

A detailed description will now be given of control of drive of the servomotor M by the controller 7. That is, the controller 7 finds a torque command by carrying out feedback control for position and velocity such that the actual position and the actual velocity fed back from the detector 3 are matched with a commanded position and a commanded velocity. Subsequently, the controller 7 finds a current command to be fed to each phase of the servomotor by carrying out current feedback control depending upon the torque command, and generates the PWM signal according to the current command value. Further, the controller 7 turns ON or OFF the switching device in each phase of the inverter 2 according to the PWM signal. In the prior art relating to the injection molding machine, the above control for the servomotor has been employed widely. In addition, since the present invention does not directly relate to control for the servomotor, a more detailed discussion thereof is omitted.

According to the present invention, temperature of a heater 5 is adjusted by using the above-mentioned DC power source 1 employed to control the servomotor M. Specifically, as shown in FIG. 1, a semiconductor switching circuit 4 is interposed between the DC power source 1 and the heater 5, and power supply from the DC power source 1 to the heater 5 is adjusted by controlling an ON/OFF operation of a switching device in the semiconductor switching circuit 4.

The heater 5 includes various types of heaters such as a band heater mounted on an injection cylinder main body in the injection molding machine or on a nozzle at a distal end of the injection cylinder, or a rod heater embedded in a mold. Further, the semiconductor switching circuit 4 includes a power transistor, a power-FET, and so forth.

A temperature sensor 6 such as a thermocouple can detect a temperature of heating target object which is heated by the heater 5. A detection signal from the temperature sensor 6 is input into the controller 7 after amplification in an amplifier 8. The controller 7 converts the input signal, through A/D conversion, into a temperature feedback value for the temperature control. Depending upon the temperature feedback value, a temperature control program previously programmed in a memory, and a set value of a rising target temperature, the controller 7 carries out PID control (including Proportional plus Integral plus Derivative control) as in the conventional temperature control so as to generate the PWM signal for control of an ON/OFF operation of the semiconductor switching circuit 4. The semiconductor switching circuit 4 is turned ON or OFF according to the PWM signal, resulting in control of a time period of power supply from the DC power source 1 to the heater 5.

The PWM signal can be obtained by comparing a modulating carrier wave (i.e., a triangular wave) with a command value obtained from the PID control to serve as a manipulated variable. A large temperature deviation between the temperature detected by the temperature sensor 6 (i.e., the temperature feedback value) and the target temperature increases the command value, thereby increasing a pulse width of the PWM signal. Otherwise, a small temperature deviation reduces the command value, resulting in a smaller pulse width of the PWM signal.

Figure 2:
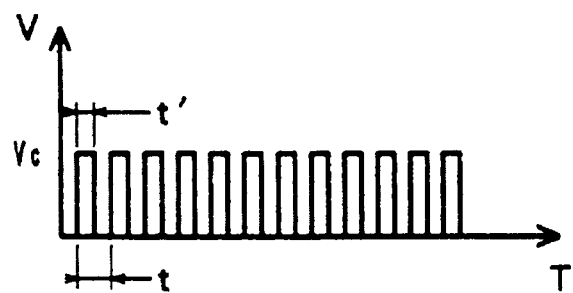
FIG. 2 is a diagram showing a PWM (pulse width modulation) waveform in the embodiment.

FIG. 2 illustrates the PWM signal in the embodiment. In the drawing, t means a cycle of the carrier wave (the triangular wave), and t' is an ON time period of the PWM signal. The ON time period t' of the PWM signal is a time period for which the semiconductor switching device in the semiconductor switching circuit 4 is held ON, that is, a time interval for which power is supplied to the heater (i.e., the conducting time period). A value of the conducting time t' can continuously be varied in the range from zero to t, that is, to the cycle of the carrier wave (the triangular wave).

When output voltage from the DC power source 1 is defined as Vc, DC mean voltage Va output from the semiconductor switching circuit 4 can be expressed as follows:

$$Va=Vc \cdot t'/t$$

In other words, a linear relationship is established between the DC mean voltage supplied to the heater and the ON time period of the PWM signal.

As set forth above, according to the present invention, the DC circuit supplies power to the heater so as to linearly control the DC mean voltage to be supplied to the heater. It is thereby possible to reduce the temperature rising time period, and optionally adjust a temperature rising velocity. As a result, it is possible to extremely easily control temperature of the heater, eliminate overshoot or undershoot of the temperature, and provide fine temperature control. Further, the switching circuit including the semiconductor device controls an ON/OFF state of the power supplied to the heater. As a result, there is no mechanical limitation of ON/OFF switching cycle, and accurate control of the heater temperature in the injection molding machine can be ensured by fine switching control of the ON/OFF state.

Figure 3:
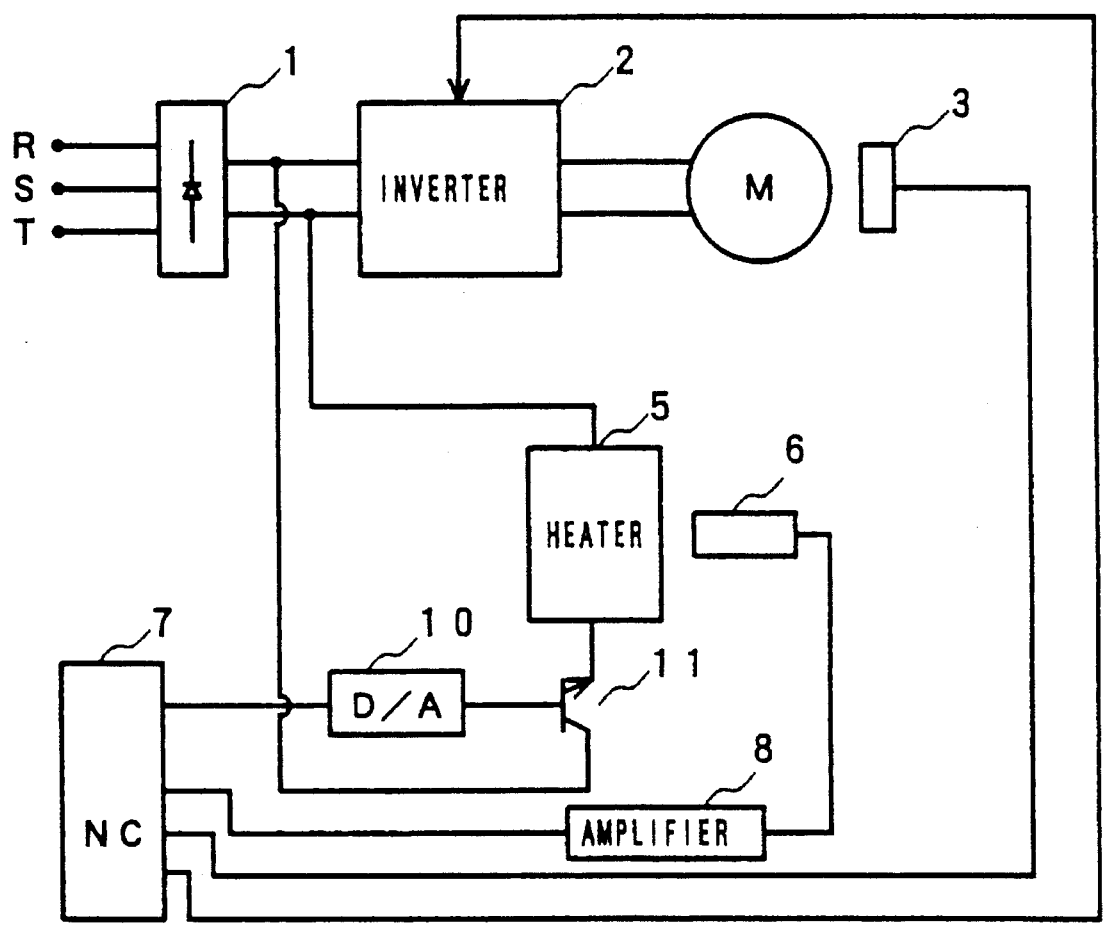
FIG. 3 is a block diagram showing another embodiment of the present invention.

FIG. 3 is a block diagram showing another embodiment of the present invention. The same reference numerals are used for component parts identical with those in the above embodiment. This embodiment is different from the above embodiment in that analog current flows in a heater 5, and for this purpose, a transistor 11 is employed as an analog amplifier to adjust power supplied to the heater 5.

That is, the heater 5 is connected through the transistor 11 serving as the analog amplifier to a DC power source 1 of an inverter 2 for inverter control of a servomotor M. A power supply command value is input from a controller 7 into a base of the transistor 11 through a D/A converter 10. The transistor 11 supplies power from the DC power source 1 to the heater 5 in the amplification degree according to the power supply command value.

Depending upon a temperature control program previously programmed in a memory, a set value of a rising target temperature, and a detected temperature fed back from a temperature sensor 6 through an amplifier 8, the power supply command value can be obtained through the PID control (Proportional plus Integral plus Derivative control) as in the conventional temperature control. Since the power supply command value can continuously be varied in the range of zero to the maximum value, it is possible to continuously vary current supplied to the heater 5 in the range of zero to the maximum value.

As described above, in the heater control device of the present invention, the DC power source supplies power to the heater in the injection molding machine so as to eliminate the irregularity in the power supply. As a result, it is possible to accurately control a heat value per unit time. Further, the DC power source for the inverter to control the servomotor also serves as the DC power source for the heater. Consequently, it is possible to eliminate the need for mounting a special power source circuit on the injection molding machine for stable power supply to the heater. Further, if PWM processing for control of the servomotor is used, the device can effectively be utilized without any special control circuit.

What is claimed is:

1. A heater control device in an electrically-operated injection molding machine, comprising:

a direct current power source which converts alternating current from an alternating current power source into direct current;

a servo motor for driving a section of the injection molding machine;

a heater mounted on a part of the injection molding machine for supplying heat thereto;

an inverter which lies between said direct current power source and said servo motor, said inverter being provided with switching elements therein; and a controller which controls ON/OFF operation of said switching elements in said inverter so as to control current supply to each phase of said servo motor;

wherein said heater is connected to said direct current power source through the medium of an electric current, voltage or power adjusting circuit; and operation of said electric current, voltage or power adjusting circuit is controlled by means of temperature adjusting signals output from said controller;

whereby electric power from the direct current power source, which is used for the drive of the servo motor, is fed to the heater, and the amount of power to be fed to the heater is controlled for adjusting the temperature of the heater.

2. A control device in an injection molding machine according to claim 1, wherein said switching circuit adjusts power fed to said heater from said DC power source by controlling an ON time interval.

3. A control device in an injection molding machine according to claim 2, wherein the ON time interval of said switching circuit is controlled according to conditions including an actual heating temperature and a target heating temperature of a heating target object.

4. A control device in an injection molding machine according to claim 3, wherein:

the ON time interval of said switching circuit is controlled through feedback control in the controller according to the conditions; and the controller generates a PWM signal so as to turn ON or OFF said switching circuit.

5. A control device in an injection molding machine according to claim 1, wherein said switching circuit includes an analog amplifier, and a value of the power fed to said heater is adjusted by supplying the amplifier with a signal to control its amplification degree.

6. A control device in an injection molding machine according to claim 5, wherein the amplification degree of said analog amplifier is controlled according to conditions including an actual heating temperature and a target heating temperature of a heating target object heated by the heater.

7. A heater control device in an injection molding machine according to claim 6, wherein said analog amplifier comprises:

a transistor having a base terminal receiving as input a power supply command obtained through feedback control from the controller, thereby setting the amplification degree of the transistor to a value.

8. A control device in an injection molding machine according to claim 1, wherein said switching circuit adjusts a value of voltage fed to said heater by controlling an ON time interval.

9. A control device in an injection molding machine according to claim 1, wherein said switching circuit includes an analog amplifier, and a value of voltage fed to said heater is adjusted by supplying the amplifier with a signal to control its amplification degree.

10. The heater control device according to claim 1, wherein the section of the injection molding machine is an injection shaft.

11. The heater control device according to claim 1, wherein the part of the injection molding machine on which the heater is mounted is a main body of an injection cylinder.

12. The heater control device according to claim 1, wherein the part of the injection molding machine on which the heater is mounted is a nozzle fixed at a distal end of the injection cylinder.

13. The heater control device according to claim 1, wherein the part of the injection molding machine on which the heater is mounted is a nozzle fixed inside a mold.

14. A control device in an injection molding machine, comprising:

a servomotor having N phases wherein N is an integer;

a DC power source which converts three-phase AC current into dc current through full-wave rectification;

an inverter which receives the DC current from said DC power source and outputs N-phase current to the servomotor in response to a first PWM control signal;

a heater which supplies heat to the injection molding machine;

a switching circuit interposed between the DC power source and the heater which controls DC current supplied to said heater in response to a second PWM control signal; and a controller which outputs a first PWM control signal to control the inverter and a second PWM control signal to control the switching circuit.

15. A control device in an injection molding machine, comprising:

a servomotor;

a DC power source which converts three-phase AC current into DC current through full-wave rectification;

an inverter which receives the DC current from said DC power source and outputs phase current to the servomotor in response to a first PWM control signal;

a heater which supplies heat to the injection molding machine;

an analog transistor interposed between the DC power source and the heater which controls DC current supplied to said heater from said DC power source in response to a second PWM control signal; and a controller which outputs a first PWM control signal to control the inverter and a second PWM control signal to control the analog transistor.

16. A control device in an injection molding machine, comprising:

a servomotor having a plurality of phases;

a DC power source which converts three-phase AC current into DC current through full-wave rectification;

an inverter which receives the DC current from said DC power source and outputs current to each phase of the servomotor in response to a received control signal;

a heater which supplies heat to the injection molding machine;

a switching circuit interposed between the DC power source and the heater which controls the heat supplied to the injection molding machine from said heater; and a controller which controls said switching circuit to thereby control the heat supplied to the injection molding machine and which outputs a control signal to control the inverter.

* * * * *